Aug. 3, 1943.   F. C. FRANK   2,325,944
BRAKE
Filed April 8, 1939   2 Sheets-Sheet 1

INVENTOR.
FREDERICK C. FRANK.
BY
Jerome R. Cox
ATTORNEY.

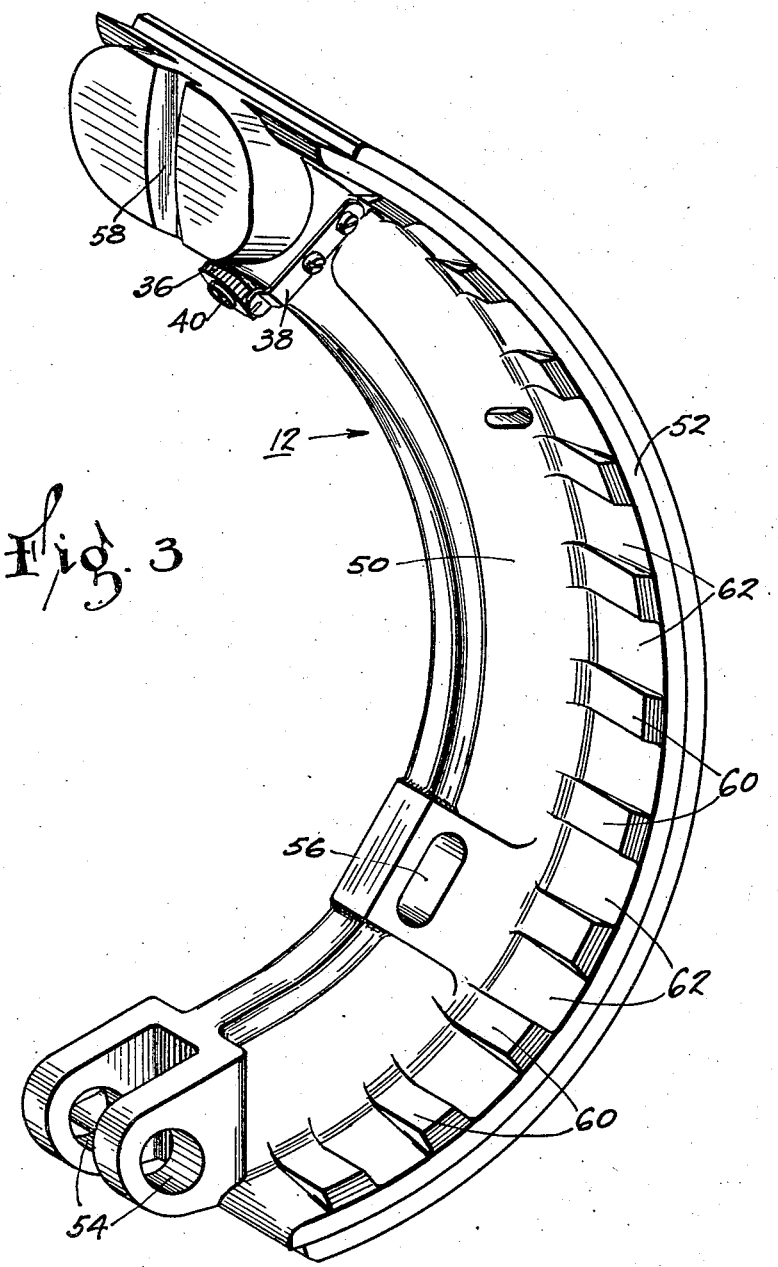

Patented Aug. 3, 1943

2,325,944

UNITED STATES PATENT OFFICE 2,325,944

BRAKE

Frederick C. Frank, South Bend, Ind., assignor to Bendix Aviation Corporation, South Bend, Ind., a corporation of Delaware Application April 8, 1939, Serial No. 266,788

10 Claims. (Cl. 188—78)

This specification comprises a description of my invention relating to improvements in brakes and is submitted for the purpose of complying with the statutes of the United States, relating to the granting of a patent.

In describing my invention, the device will first be described generally and the main respects in which it constitutes improvements over the prior art will be pointed out; then the main objects and features of the invention will be stated. Following this there will be a description of the figures of the drawings generally; then a detailed description of the structure will be given, and following this there will be a description of the operation. The claims, particularly pointing out my invention, will follow the specification.

My invention as described in the specification relates to brakes for vehicles including automotive vehicles and aerial vehicles.

Heretofore it has been found that in the use of drum brakes there is a tendency for the pressures developed to distort the brake drum with the result that when the drum is so distorted, there sometimes occurs a grabbing between the shoe and the drum. The cause for this grabbing has not been generally recognized by designers, but I have found that as above stated it is due to distortion of the drum, elongation of the drum at the points of greatest pressure with consequent narrowing of the drum at other points and the consequent impossibility of the brake shoe remaining free in these narrow portions. I have therefore devised a novel type of brake in order to eliminate this difficulty.

One of the objects of my invention is therefore to provide a brake design capable of eliminating grabbing due to drum distortion.

A further object of the invention is to provide yielding means for maintaining a brake shoe in the proper position to provide normally the desired clearance with the drum, while allowing the shoe to be moved under pressure away from the drum should the drum be distorted.

A further object of the invention is to provide a brake shoe of a design which may be satisfactorily die-cast.

A feature of the invention is the design of a brake shoe having alternate flat and tapered portions whereby the shoe may be lightened in weight, may be of adequately strong construction, may be satisfactorily die-cast, and may yet provide portions through which the lining may be riveted to the shoe.

Further objects and features of my invention will be apparent from a reading of the subjoined claims and from a consideration of the accompanying drawings in which:

Figure 3 is a view in perspective of one of the brake shoes of Figure 1.

Figure 1:
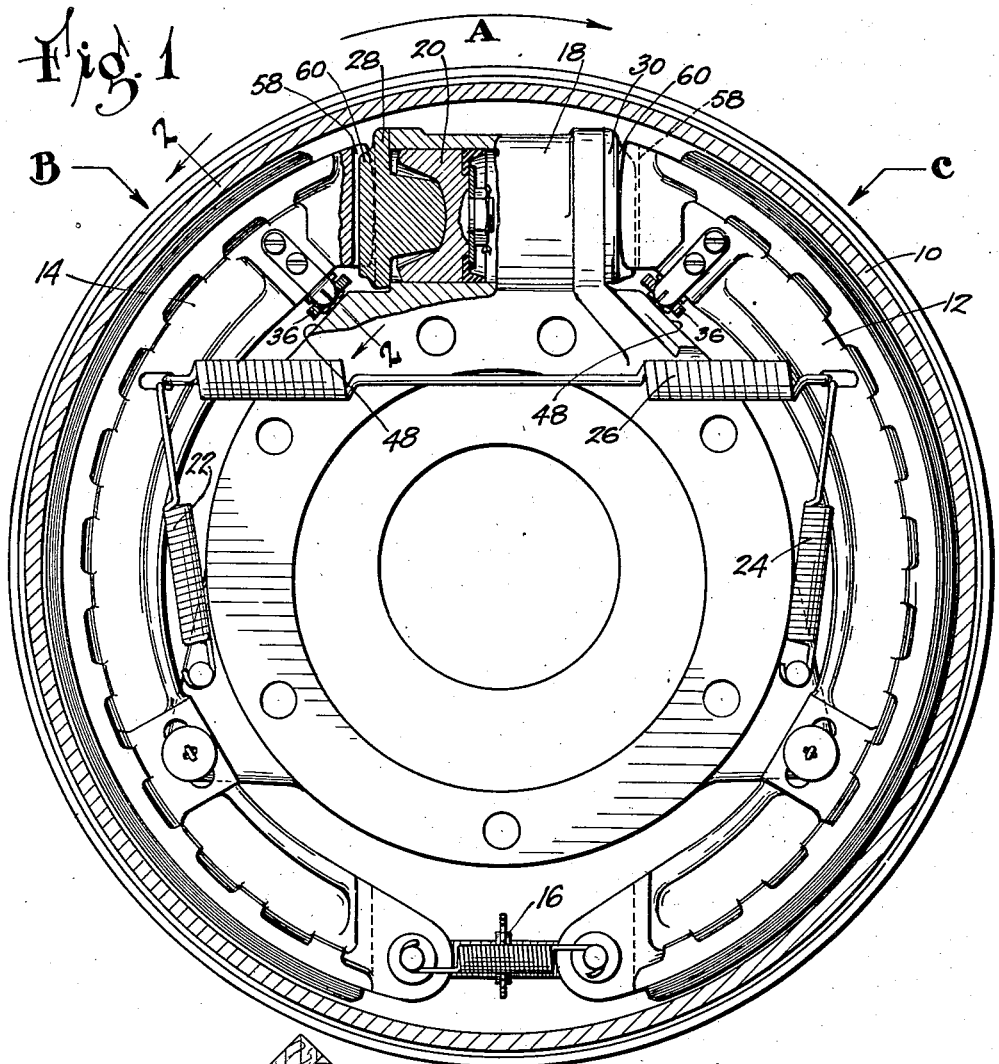
Figure 1 is a view in vertical section taken through a brake of my improved construction and showing in said vertical section a drum, brake shoes in the drum, and actuating means for the brake shoes, together with positioning means, return springs, and adjusting means.

Referring in detail to the drawings, it may be seen that I have shown a brake drum 10 provided with brake shoes 12 and 14. The shoes 12 and 14 are of substantially similar construction, the shoe 12 being shown possibly more clearly in Figure 3. The shoes 12 and 14 are connected by an adjusting screw 16 and are arranged to be actuated by a hydraulic cylinder 18 provided with a pair of pistons such as the piston 20. Return springs 22, 24 and 26 are arranged to return the shoes from their applied position to a released position when applying force is withdrawn from the cylinder 18.

The brake is of the duo servo type in which both shoes anchor on one of the shoes in both directions of rotation of the wheel. That is, during forward movement of the vehicle the drum is turning in the direction of the arrow A and thereupon the primary shoe 12 applies the secondary shoe 14 through the strut link or adjusting screw 16. The shoe 14 anchors on the anchor cap 28 which in turn anchors on the end of the cylinder 18.

On the other hand, when the vehicle is moving in reverse direction, the piston 20 applies the shoe 14 (which then becomes the primary shoe) to the drum through the anchor cap 28 and the torque created by this application acts through the strut link 16 on the shoe 12 (becoming the secondary shoe) and applies it to the drum. Then the shoe 12 anchors through the anchor cap 30 on the cylinder 18. Thus, in both directions of rotation both shoes anchor through one of the shoes on the cylinder 18.

I have found that with this arrangement high pressures are created adjacent to the upper end of the secondary shoe. That is, when the brake is applied strongly during braking from forward movement, high pressures are created by the then secondary shoe 14 approximately at the point B. In braking from reverse movement, high pressures are created from the then secondary shoe 12 approximately at the point C. These high pressures tend to elongate the drum along a diameter passing through these points of high pressures and consequently narrow the drum at points approximately 90° therefrom. I have found that during these times of high pressures there is a tendency for the shoe and drum to grab at such narrowed points. For instance, during forward braking, the brake is liable to grab at a point adjacent to the point B. In order to overcome this grabbing it has been necessary heretofore to provide excessive clearance so that the grabbing might be eliminated. The provision of excessive clearance requires that there be a long pedal stroke to take up this clearance.

Figure 2:
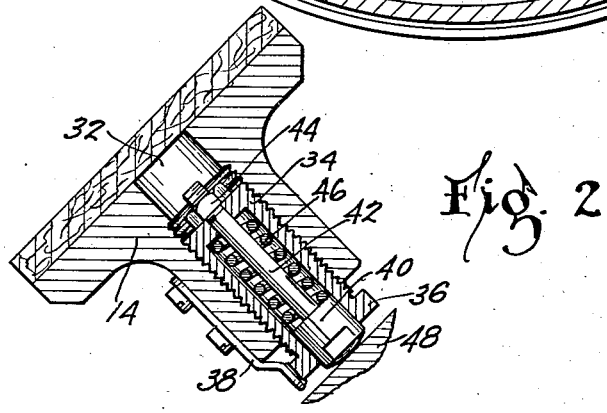
Figure 2 is a view in section taken substantially through the line 2—2 of Figure 1.

I have provided means whereby a normal limited amount of clearance might be provided and yet the grabbing due to drum distortion might be eliminated. I have provided an adjustable yieldable positioning means such as that which is shown most clearly in Figure 2. As may be seen therein, the shoe 14 is formed with a bore 32 into which there is threaded a sleeve 34. The sleeve 34 is formed with a notched head 36 by means of which the sleeve may be screwed in or out and thus the adjustment of the positioning means changed. The adjustment is maintained against unwanted change by a spring pawl 38 which contacts the notched head 36. Within the sleeve 36 there is inserted a plunger 40 having a stem 42 onto the end of which there is screwed a nut 44 which provides a means by which the plunger 40 may be adjusted relative to the sleeve 36. A relatively heavy spring 46 bears at one end on the sleeve 34 and at the opposite end on the head of the plunger 40. The plunger 40 is arranged normally to rest on a shoulder 48 formed on the backing plate 11. The spring 46 is of such strength that it cannot be retracted by action of the return springs 22, 24 and 26, but is compressed whenever the force exerted by the drum on the shoe becomes excessive.

When the brake is released and in normal unapplied position, the shoe is positioned relative to the drum with a slight clearance by the plunger 40 as is shown in Figure 1. When the brake is applied the plunger 40 on the primary shoe moves away from the shoulder 48 initially and the torque created by that shoe in braking applies the secondary shoe so that that shoe also moves away from the shoulder. However, the pressure created by the secondary shoe tends to distort the drum and moves the primary shoe inward so that the plunger 40 again contacts the shoulder 48. As this distortion continues, sufficient force is exterted to compress the spring 46 and push the plunger 40 in. This movement inward of the plunger 40 prevents the possibility of the shoes grabbing at this point. Upon release of the brakes the spring expands so as to position the shoes as desired with a normal minimum clearance.

I have also provided a new design of a brake shoe which is shown most clearly in Figure 3. As may be seen therein, the shoe 12 is formed with a web 50 and a rim 52. It is provided with openings 54 for connection to the strut link 16 and an opening 56 through which a hold-down spring arrangement may extend. It is also provided with a slot 58 arranged to fit over a tongue such as tongue 69 shown in Figure 1 for positioning the shoe relative to the anchor member 30 and the anchor member relative to the shoe.

I provide a series of flat raised portions such as 60 and a series of lowered tapered portions such as 62, it being understood that the web 50 and the rim 52 are formed integral in the die-casting process and that the lowered tapered portions 62 enable the shoe to be so die-cast and to be readily removable from the mold. These flat raised portions 60 are in spaced relation on the underside of the shoe rim. The rim portions 62 joining the raised portions 60 are relatively thin and tapering in cross-section with the increase in taper toward the web 50. Thus it will be seen that to give great strength and rigidity with minimum weight the shoe is formed of a rim and a substantially skeleton structure comprising the web 50 and the flat bracket portions 60. The intermediate tapering portions 62 complete the rim.

It is believed that the operation of my improved brake will be more or less apparent from the above description. The brake is shown in its normal released position in Figure 1. The supply of fluid under pressure to the cylinder 18 forces the pistons 20 outward, thus acting through the anchor cap members 28 and 30 to move the shoes 14 and 12 into drum contact. Depending upon the direction of the rotation of the drum, one or the other of the shoes forces the portion of the other shoe adjacent the adjusting strut 16 into drum contact and both shoes anchor through one shoe upon its associated anchor member on cylinder 18. While the shoes in released position are normally positioned by the adjusting plunger 40 with a minimum clearance, yet should the drum be distorted one or the other plunger 40 may be moved inward compressing its associated spring 46 and preventing grabbing or locking of the brake.

The process by which my improved shoe as shown in Figure 3 is manufactured is one of die-casting and the design of the shoe with the tapered raised portions 60 enables the shoe to be readily withdrawn from the mold.

It is to be understood that the above described embodiments of my invention are for the purpose of illustration only and various changes may be made therein without departing from the spirit and scope of my invention.

I claim:

1. A brake comprising a drum, a pair of shoes within said drum, a backing plate on which said shoes are mounted, means for moving said shoes into drum contact, and means for causing the braking torque of one shoe to act on the opposite shoe and anchor through said opposite shoe so that both shoes anchor through one shoe in both directions of rotation in combination with resilient means for positioning said shoes to determine their drum clearance in released position, said resilient means comprising a stop associated with the backing plate, a plunger associated with one of said shoes and normally contacting said stop, a sleeve within which said plunger acts and a spring bearing at one end upon said sleeve and at the other end upon said plunger.

2. A brake comprising a backing plate; a pair of shoes on said backing plate; a drum within which said shoes are positioned; means comprising a cylinder and piston therein for moving said shoes into contact with the drum so arranged that both shoes anchor through one shoe in each direction of rotation of the drum; and floating anchor means for said shoes, said floating anchor means comprising an anchor cap having a tongue fitting in a groove in its associated shoe, having an extension fitting in a recess in its associated piston, and having a shoulder bearing upon a portion of the cylinder for anchoring its associated shoe.

3. A brake comprising a drum, a shoe within said drum having an opening therein, a backing plate on which the shoe is mounted, a plunger extending into the opening in the shoe, a spring tending to hold the plunger from radial movement toward the drum, and means associated with the backing plate for positioning the plunger.

4. A brake comprising a support member; a shiftably anchoring friction element floatingly mounted on said support member; a drum within which said friction element is positioned; means comprising a cylinder and piston therein for moving the friction element into contact with the drum; and a floating force transmitting device associated with said friction element and moving means comprising an anchor cap having a tongue fitting in a groove in the friction element, having an extension fitting in a recess in the piston, and having a shoulder bearing upon a portion of the cylinder for anchoring the friction element.

5. A brake comprising a drum, a support member, a floating friction element mounted on said support member and adapted to anchor at one end or the other according to the direction of drum rotation, a device for anchoring the friction element which has sliding contact with the anchoring end of the friction element, and means to compensate for drum distortion which means resiliently determine the radial distance between friction element and drum.

6. A brake comprising a drum, a shoe within said drum and having an opening therein which extends substantially along an imaginary line leading from the drum toward the central portion of the brake, a backing plate on which the shoe is mounted, a plunger extending into said opening in the shoe, a spring tending to hold the plunger from movement toward the drum, and means associated with the backing plate and positioning the plunger.

7. A brake comprising a backing plate, a pair of floating shoes mounted on the backing plate and arranged to anchor through one shoe in one direction of rotation and through the other shoe in the other direction of rotation, a hydraulic cylinder having a pair of pistons therein for actuating the shoes, and floating anchor means interposed between the ends of the shoes and the pistons, said anchor means having sliding surface contact with the ends of the respective shoes and being pivoted on the ends of the respective pistons.

8. In braking apparatus, a rotatable drum, a support, a brake shoe mounted on the support for cooperation with the drum, means including a fixed stop for causing said shoe to have a predetermined "off" position with respect to the drum when retracted, and means for permitting the shoe to be moved closer to the center of the drum than said "off" position when said shoe is acted upon during brake application by a force created by drum distortion, said means being ineffective to alter the relationship between the shoe and the stop when the shoe is retracted after any brake application.

9. In braking apparatus, a rotatable drum, a support, a brake shoe mounted on the support for cooperation with the drum, a fixed stop on the support, and means associated with the shoe and the stop causing the shoe to have a predetermined "off" position with respect to the drum when retracted, said means being yieldable under a force created by distortion of the drum during braking to permit the shoes to be moved closer to the center of the drum than said "off" position, but unaffected by changes in temperature during braking to alter the relationship between the shoe and the stop when the shoe is retracted after any brake application.

10. In braking apparatus, a rotatable drum, a support, a brake shoe mounted on the support for cooperation with the drum, a fixed stop on the support for determining the normal "off" position of the shoe, said drum being subject to such distortion during braking that it will if permitted move the shoe toward the center of the drum and to a point beyond its normal "off" position, and yieldable means so associated with the stop and the brake shoe permitting said shoe to assume normal "off" position without yielding or to yield and permit the shoe to be moved further toward the center of the drum than said normal "off" position if so caused by drum distortion during braking, said yieldable means being unaffected by changes in temperature during braking to alter the relationship between the shoe and stop when the shoe is retracted after any brake application.

FREDERICK C. FRANK.